(12) United States Patent
Kim et al.

(10) Patent No.: US 11,897,416 B2
(45) Date of Patent: Feb. 13, 2024

(54) SEAT BELT AND MOVEMENT CONTROL METHOD THEREOF

(71) Applicants: Hyundai Motor Company, Seoul (KR); Kia Corporation, Seoul (KR); Samsong Industries, Ltd., Seoul (KR)

(72) Inventors: Dae Woon Kim, Suwon-Si (KR); Il Chang Sung, Hwaseong-Si (KR); Won Ryong Song, Changwon-Si (KR); Jung Woo Park, Changwon-Si (KR)

(73) Assignees: Hyundai Motor Company, Seoul (KR); Kia Corporation, Seoul (KR); SAMSONG INDUSTRIES, LTD., Seoul (KR)

(*) Notice: Subject to any disclaimer, the term of this patent is extended or adjusted under 35 U.S.C. 154(b) by 0 days.

(21) Appl. No.: 17/842,673

(22) Filed: Jun. 16, 2022

(65) Prior Publication Data
US 2023/0051418 A1    Feb. 16, 2023

(30) Foreign Application Priority Data
Aug. 11, 2021    (KR) .................... 10-2021-0106287

(51) Int. Cl.
*B60R 22/20* (2006.01)
*B60R 22/26* (2006.01)

(52) U.S. Cl.
CPC .............. *B60R 22/20* (2013.01); *B60R 22/26* (2013.01); *B60R 2022/208* (2013.01)

(58) Field of Classification Search
CPC ....... B60R 22/26; B60R 22/06; B60R 22/201; B60R 22/203; B60R 2022/1806; B60R 2022/207; B60R 2022/208; B60R 2022/4808

USPC ............................................... 280/804, 801.2
See application file for complete search history.

(56) References Cited

U.S. PATENT DOCUMENTS

| | | | | |
|---|---|---|---|---|
| 4,317,584 | A * | 3/1982 | Takata | B60R 22/06 297/469 |
| 5,123,673 | A * | 6/1992 | Tame | B60R 22/26 280/808 |
| 5,261,696 | A * | 11/1993 | Hamaue | B60R 22/03 280/808 |

(Continued)

FOREIGN PATENT DOCUMENTS

| KR | 10-2011-0025532 | 3/2011 |
|---|---|---|
| KR | 10-1199715 | 11/2012 |

(Continued)

OTHER PUBLICATIONS

English translation for Tanabe WO-2022071408-A1, earliest priority Sep. 30, 2020, retrieved Jul. 25, 2023 (Year: 2021).*

*Primary Examiner* — Paul N Dickson
*Assistant Examiner* — Caitlin Anne Miller
(74) *Attorney, Agent, or Firm* — MORGAN, LEWIS & BOCKIUS LLP

(57) ABSTRACT

A seat belt to increase a force for restraining a passenger's lower body in a sitting state of a relaxation mode while satisfying existing laws in a normal sitting state and to a movement control method thereof includes an anchor unit provided on a lower portion of a first side surface of a seat and configured for allowing webbing of the seat belt to be locked thereto and an anchor moving apparatus configured to move the anchor unit forwards and backwards thereof, and to a movement control method thereof.

16 Claims, 5 Drawing Sheets

(56) References Cited

U.S. PATENT DOCUMENTS

| | | | | |
|---|---|---|---|---|
| 6,193,275 | B1* | 2/2001 | Knox | B60R 22/03 |
| | | | | 280/808 |
| 6,308,986 | B1* | 10/2001 | Townsend | B60R 22/03 |
| | | | | 280/808 |
| 6,550,867 | B2* | 4/2003 | Rogers, Jr. | B60R 22/03 |
| | | | | 280/808 |
| 6,769,716 | B2* | 8/2004 | Rouhana | B60R 22/02 |
| | | | | 297/480 |
| 6,883,834 | B2* | 4/2005 | Grabowski | B60R 22/03 |
| | | | | 280/802 |
| 6,969,088 | B2* | 11/2005 | Wang | B60R 22/28 |
| | | | | 280/805 |
| 8,087,697 | B2* | 1/2012 | Tanaka | B60R 22/03 |
| | | | | 297/481 |
| 8,157,292 | B2* | 4/2012 | You | B60R 22/03 |
| | | | | 280/801.1 |
| 8,550,499 | B2 | 10/2013 | Russell et al. | |
| 10,081,330 | B2* | 9/2018 | Arnold | B60N 2/688 |
| 11,180,110 | B2* | 11/2021 | Jaradi | B60R 22/26 |
| 11,623,607 | B1* | 4/2023 | Dix | B60R 22/06 |
| | | | | 280/802 |
| 2002/0043872 | A1* | 4/2002 | Townsend | B60R 22/26 |
| | | | | 297/473 |

FOREIGN PATENT DOCUMENTS

| | | |
|---|---|---|
| KR | 10-1331448 | 11/2013 |
| KR | 10-1356180 | 1/2014 |
| KR | 10-1500265 | 3/2015 |
| KR | 10-1674496 | 11/2016 |
| WO | WO-2022071408 A1 * | 4/2022 |

* cited by examiner

SEAT BELT AND MOVEMENT CONTROL METHOD THEREOF

CROSS REFERENCE TO RELATED APPLICATION

The present application claims priority to Korean Patent Application No. 10-2021-0106287, filed Aug. 11, 2021, the entire contents of which is incorporated herein for all purposes by this reference.

BACKGROUND OF THE PRESENT DISCLOSURE

Field of the Present Disclosure

The present disclosure relates to a seat belt to increase a force for restraining a passenger's lower body in a sitting state of a relaxation mode while satisfying existing laws in a normal sitting state and to a movement control method thereof.

Description of Related Art

When the impact of a vehicle collision is detected, a seat belt anchor pretensioner pulls an anchor portion to which webbing is fixed to rewind and tighten a waist belt, performing a role of fixing a passenger's lower body to a seat.

Accordingly, since forward movement of the passenger's pelvis is suppressed, the passenger's movement is stabilized so that the passenger's lower body is prevented from colliding with an internal material such as a crush pad and the like.

However, in the case of a relaxation mode in which the passenger is boarded with a seatback tilted backward, even if the seat belt anchor pretensioner is activated, a submarine phenomenon of the seat belt occurs when a waist belt slips from the passenger's pelvis, and thus a problem that the passenger's injury is increased arises.

The submarine phenomenon of the seat belt refers to a phenomenon in which the waist belt that holds the pelvis escapes from the pelvis and moves up to the abdomen in the event of a collision so that load is concentrated on chest and abdomen areas, increasing injuries.

Accordingly, there is a demand for a seat belt structure that satisfies existing laws in a normal sitting state and increases a force for restraining the passenger's lower body in a sitting state of the relaxation mode.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a seat belt apparatus to increase a force for restraining a passenger's lower body in a sitting state of a relaxation mode while satisfying the existing laws in a normal sitting state and to a movement control method thereof.

To achieve the above objectives, the seat belt apparatus according to an exemplary embodiment of the present disclosure may include: an anchor unit provided on a lower portion of one side surface of a seat and configured for allowing webbing of the seat belt apparatus to be locked thereto; and an anchor moving apparatus configured to move the anchor unit forwards and backwards thereof.

The anchor moving apparatus may include: a motor configured to provide rotational force; and a motion conversion apparatus configured to linearly move the anchor unit by converting rotation motion of the motor into linear motion of the anchor unit.

The motion conversion apparatus may include: a screw provided before and after the seat and configured to be rotated by the rotational force transmitted from the motor; and a carrier coupled to the anchor unit, including a screw hole formed in the carrier for the screw to be inserted into and engaged to the screw hole, and configured to move forwards and backwards together with the anchor unit according to a rotation of the screw.

Front and rear end portions of the screw may be rotatably supported by bearings; an upper pulley may be coupled to a shaft of the motor; a lower pulley may be coupled to the screw; and the upper pulley and the lower pulley may be coupled by a power transmission belt to transmit the rotational force of the motor to the screw.

The anchor moving apparatus may be provided on the seat.

The seat belt apparatus may further include: a controller configured to move the anchor unit forwards and backwards by controlling operation of the motor when a state of the seat determined based on a position of the seat satisfies a forward movement state or a backward movement state of the anchor unit.

The seat belt apparatus may further include: a buckle provided on a lower portion of the other side surface of the seat and configured to allow a tongue of the seat belt apparatus to be fastened thereto; and a buckle moving apparatus configured to move the buckle forwards and backwards thereof.

The buckle moving apparatus may include: a motor configured to provide rotational force; and a motion conversion apparatus configured to linearly move the buckle by converting rotation motion of the motor into linear motion of the buckle.

The motion conversion apparatus may include: a screw provided before and after the seat and configured to be rotated by the rotational force transmitted from the motor; and a carrier coupled to the buckle, including a screw hole formed in the carrier for the screw to be inserted into and engaged to the screw hole, and configured to move forwards and backwards together with the buckle according to a rotation of the screw.

Front and rear end portions of the screw may be rotatably supported by bearings; an upper pulley may be coupled to a shaft of the motor; a lower pulley may be coupled to the screw; and the upper pulley and the lower pulley may be coupled by a power transmission belt to transmit the rotational force of the motor to the screw.

The buckle moving apparatus may be provided on the seat.

The seat belt apparatus may further include: a controller configured to control operation of the motor to move the anchor unit forwards and backwards when an opening state or a closing state of a door and a fastening state of the buckle satisfy a forward movement state or a backward movement state of the anchor unit.

A seat belt apparatus of the present disclosure may also include: a buckle provided on a lower portion of a side surface of a seat and configured to allow a tongue of the seat belt apparatus to be fastened thereto; and a buckle moving apparatus configured to move the buckle forwards and backwards thereof, wherein the buckle moving apparatus includes: a motor configured to provide rotational force; and a motion conversion apparatus configured to move the buckle linearly by converting rotation motion of the motor into linear motion of the buckle.

A movement control method for a seat belt apparatus may include: detecting, by a controller, a state of a seat to detect the state of the seat based on a position of the seat; and controlling, by the controller, movement of an anchor unit to move the anchor unit forwards and backwards when the state of the seat satisfies a forward movement state or a backward movement state of the anchor unit to which webbing of the seat belt apparatus is fastened.

When the state of the seat is a relaxation mode while the buckle is fastened, the forward movement state of the anchor unit is satisfied.

The movement control method for a seat belt apparatus may further include: controlling movement of the buckle to move the buckle forwards and backwards when a state of a vehicle and a fastening state of the buckle satisfy the forward movement state or the backward movement state of the buckle.

When a door of the vehicle is open, the forward movement state of the buckle is satisfied.

When the buckle is fastened, the backward movement state of the buckle is satisfied.

Through the above-mentioned problem solving means, when a passenger is normally sitting on a seat, existing laws are satisfied at the time of a vehicle collision, so that the passenger who is sitting on the seat is protected safely, and when the passenger is sitting in a relaxation mode, a force for restraining the passenger's pelvis is increased by forward movement of the anchor unit, so that a force for restraining the passenger's lower body is increased, providing an advantage of protecting the passenger safely by decreasing a submarine phenomenon of the passenger.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
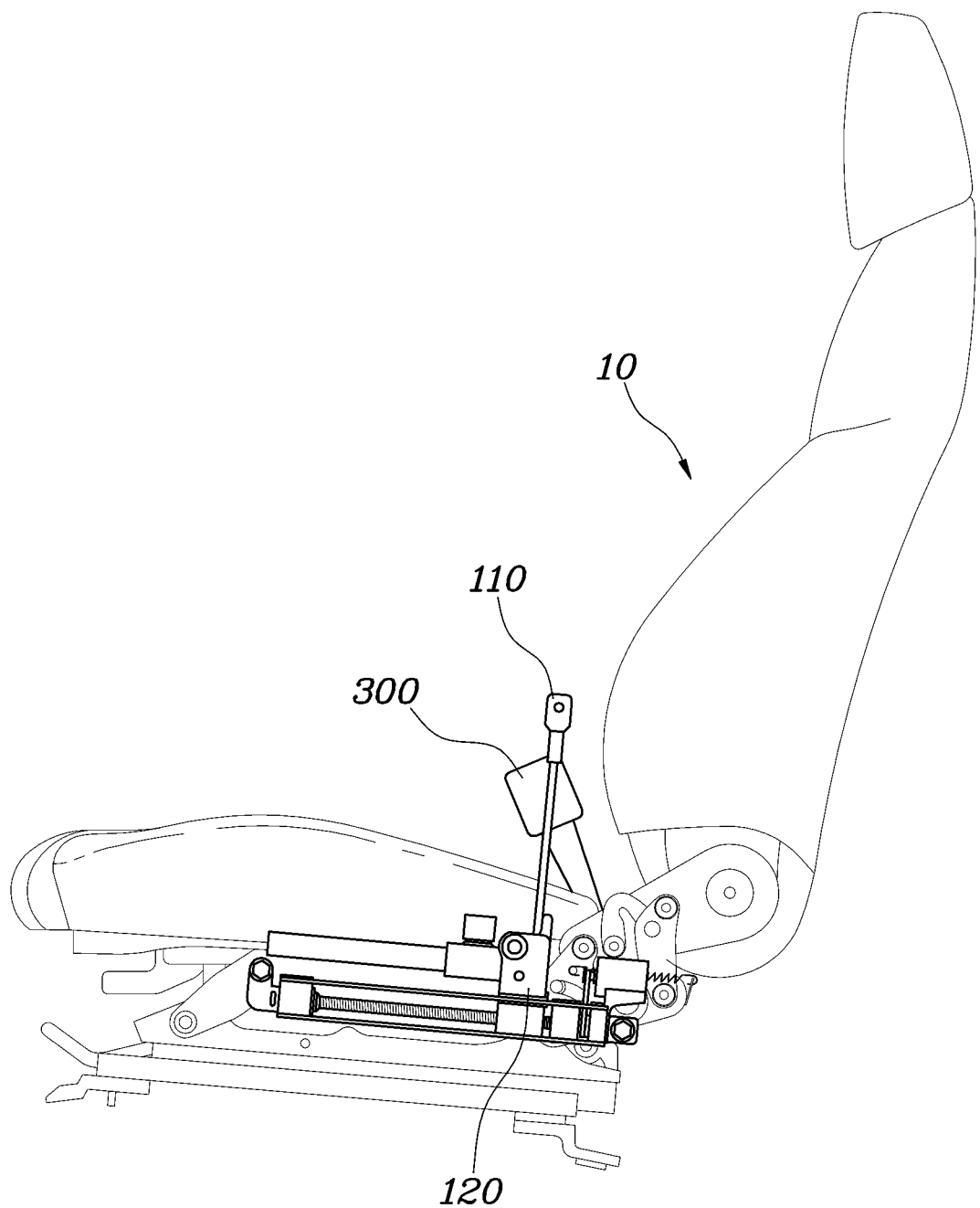
FIG. 1 is a view exemplarily illustrating a state in which an anchor unit and a buckle according to an exemplary embodiment of the present disclosure are provided on a seat.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

In the following description, the structural or functional description specified to exemplary embodiments according to the concept of the present disclosure is directed to describe the exemplary embodiments of the present disclosure, so it should be understood that the present disclosure may be variously embodied, without being limited to the exemplary embodiments of the present disclosure.

Embodiments described herein may be changed in various ways and various shapes, so specific embodiments are illustrated in the drawings and will be described in detail in the exemplary embodiment of the present disclosure. However, it should be understood that the exemplary embodiments according to the concept of the present disclosure are not limited to the exemplary embodiments which will be described hereinbelow with reference to the accompanying drawings, but all of modifications, equivalents, and substitutions are included in the scope and spirit of the present disclosure.

It will be understood that, although the terms first and/or second, etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It is to be understood that when one element is referred to as being "connected to" or "coupled to" another element, it may be directly connected to or directly coupled to another element or be connected to or coupled to another element, including the other element intervening therebetween. On the other hand, it is to be understood that when one element is referred to as being "directly connected to" or "directly coupled to" another element, it may be connected to or coupled to another element without the other element intervening therebetween. Furthermore, the terms used herein to describe a relationship between elements, that is, "between", "directly between", "adjacent", or "directly adjacent" may be construed in the same manner.

The terminology used herein is for describing various exemplary embodiments only and is not intended to limit the present disclosure. Singular forms are intended to include plural forms unless the context clearly indicates otherwise. It will be further understood that the terms "comprises" or "have" used in the exemplary embodiment, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which an exemplary embodiment of the present disclosure belongs. It must be understood that the terms defined by the dictionary are identical with the meanings within the context of the related art, and they should not be ideally or excessively formally defined unless the context clearly dictates otherwise.

Hereinbelow, exemplary embodiments of the present disclosure will be described in detail with reference to accompanying drawings.

Figure 2:
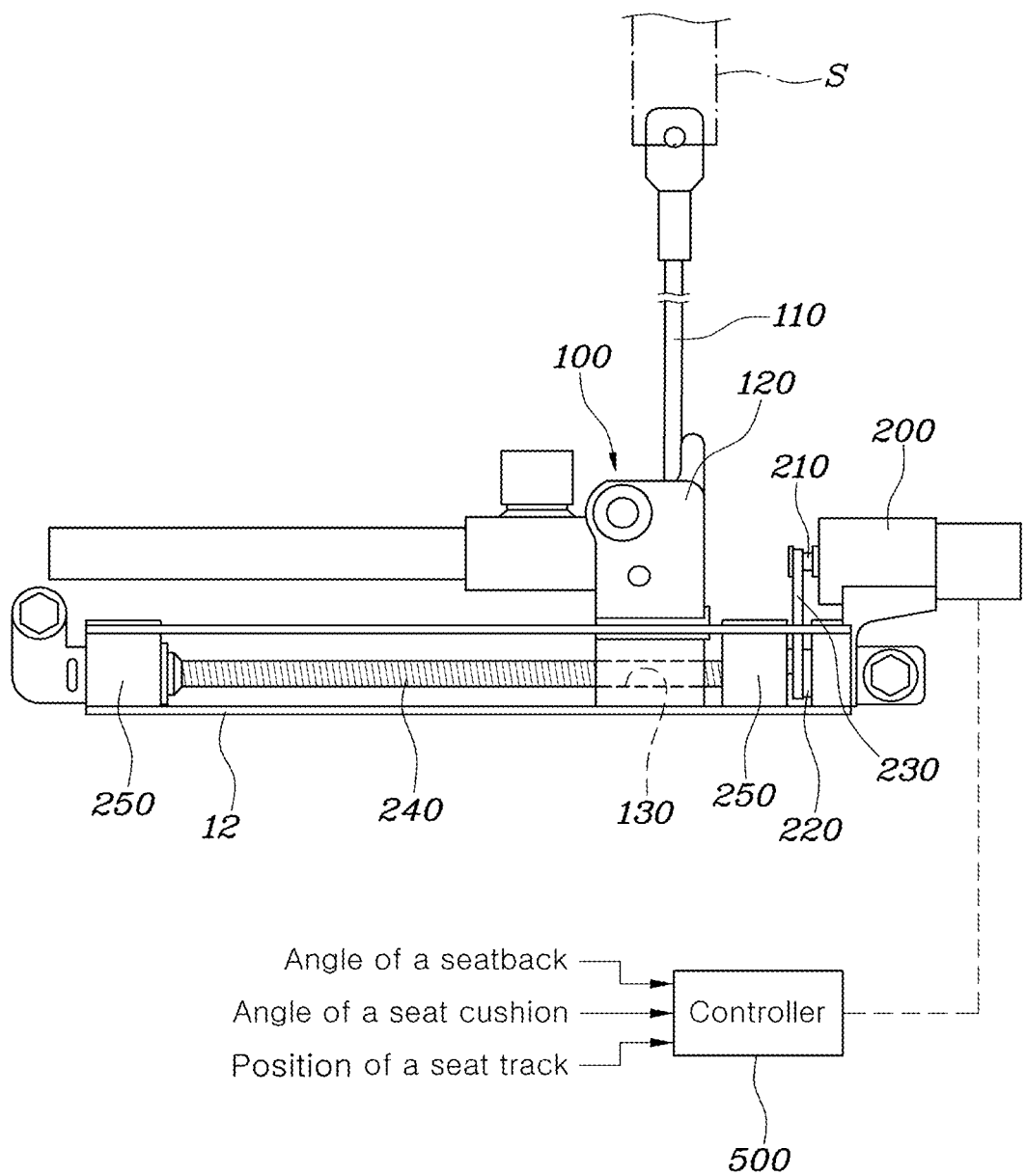
FIG. 2 is a view exemplarily illustrating a configuration of an anchor moving apparatus for moving the anchor unit according to an exemplary embodiment of the present disclosure.

FIG. 1 is a view exemplarily illustrating a state in which an anchor unit 100 and a buckle 300 according to an exemplary embodiment of the present disclosure are provided on a seat 10, and FIG. 2 is a view exemplarily illustrating a configuration of an anchor moving apparatus for moving the anchor unit 100 according to an exemplary embodiment of the present disclosure.

Referring to the views, a seat belt S according to an exemplary embodiment of the present disclosure may include: an anchor unit 100 provided under one side surface of a seat 10 and to which webbing of the seat belt S is locked; and an anchor moving apparatus configured to move the anchor unit 100 forwards and backwards thereof.

For example, the anchor unit 100 may be an anchor pretensioner 110 that pulls a waist belt of the seat belt S, which surrounds the passenger's waist, at the time of a vehicle collision to fix a passenger's lower body, wherein an end portion of the waist belt is fixed to an end portion of the anchor unit 100.

As the anchor unit 100 moves forwards and backwards by the anchor moving means, the waist belt fixed to the anchor unit 100 is also moved forwards and backwards thereof.

Figure 3:
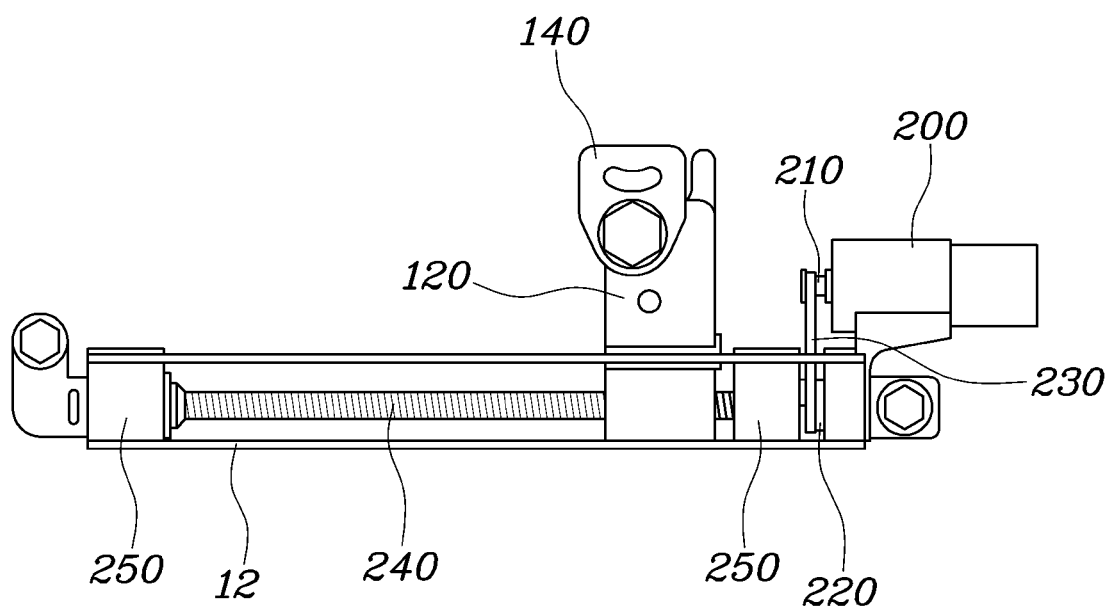
FIG. 3 is a view exemplarily illustrating a structure to which a lower anchor is applied as the anchor unit according to an exemplary embodiment of the present disclosure.

For reference, as another example of the anchor unit 100, a lower anchor 140 that does not have a pre-tensioner function as illustrated in FIG. 3 may be applied, and the anchor moving apparatus is also configured in the same way in the present structure to move the lower anchor 140 forwards and backwards thereof.

That is, the anchor unit 100 is located at the rear when the passenger is normally sitting on the seat 10, and the anchor unit 100 may move forward when the passenger is sitting in a relaxation mode.

Accordingly, in a normal sitting state, the existing laws are satisfied at the time of a vehicle collision so that a passenger who is sitting on the seat 10 is protected safely, and in a sitting state of a relaxation mode, the waist belt moves forward by forward movement of the anchor unit 100, so that a force for allowing the waist belt to escape from the passenger's pelvis is reduced, and at the same time, a force for restraining the passenger's pelvis is increased.

Therefore, as the force for restraining the passenger's lower body is increased, a submarine phenomenon of the passenger is reduced, and thus the passenger is protected safely.

Furthermore, the anchor unit 100 may be configured to be movable based on an electric driving force of a motor 200.

Referring to FIG. 2, the anchor moving apparatus may include: the motor 200 configured to provide a rotational force; and a motion conversion apparatus configured to linearly move the anchor unit 100 by converting rotation motion of the motor 200 into linear motion of the anchor unit 100.

That is, as the motor 200 and the anchor pretensioner 110 are connected by the motion converting means, the rotation motion provided from the motor 200 is converted into the linear motion by the motion converting means so that the anchor pretensioner 110 may move forward or backward thereof.

As an exemplary embodiment of the motion conversion means, the motion conversion apparatus may include: a screw 240 provided before and after the seat 10 and configured to be rotated by a rotational force transmitted from the motor 200; and a carrier 120 coupled to the anchor unit 100, including a screw hole 130 formed to allow the screw 240 to be inserted thereinto while surrounding the screw 240 in a screw structure, and configured to move forwards and backwards with the anchor unit according to a rotation direction of the screw 240.

The screw 240 is provided along a front and rear longitudinal direction of the seat 10 so that the front end portion and rear end portion of the screw 240 are rotatably supported by a bearing 250.

An upper pulley 210 is coupled to a shaft of the motor 200, a lower pulley 220 is coupled to the rear end portion of the screw 240, and the upper pulley 210 and the lower pulley 220 are coupled by a power transmission belt 230 to reduce the rotational force of the motor 200 and transmit the reduced rotational force to the screw 240.

Accordingly, when the screw 240 is rotated, the carrier 120 moves forward or backward along the screw 240 according to a rotation direction of the screw 240, and the anchor unit 100 coupled to the carrier 120 moves forwards and backwards together.

Figure 4:
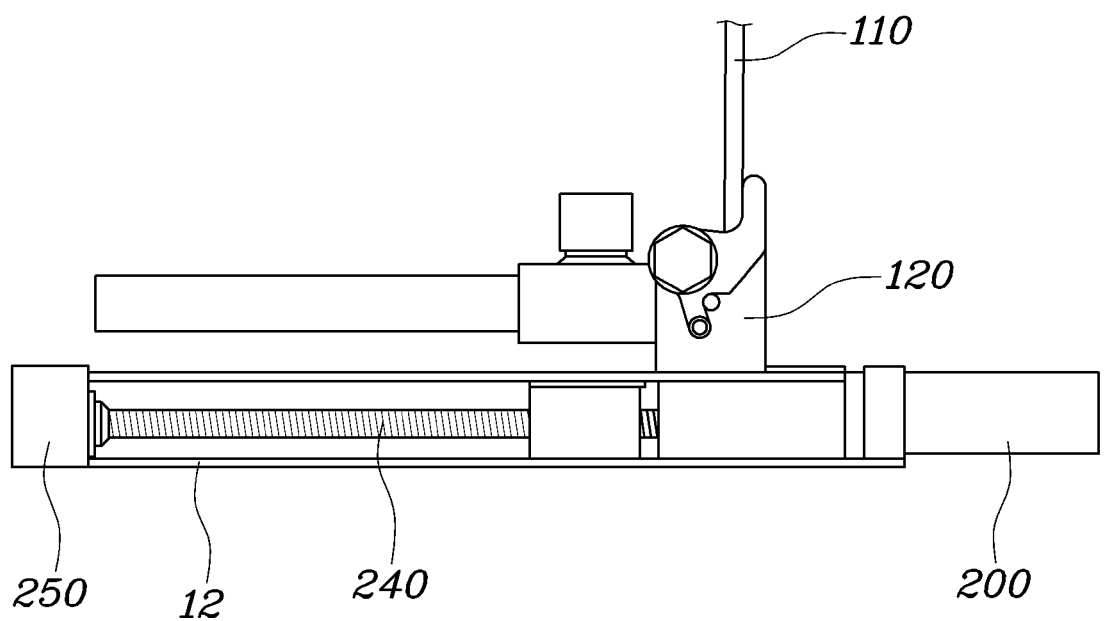
FIG. 4 is a view exemplarily illustrating a form in which a motor is directly connected to a screw according to an exemplary embodiment of the present disclosure.

For reference, as a configuration for transmitting the rotational force from the motor 200 to the screw 240, as illustrated in FIG. 4, a form in which the motor 200 is directly connected to the screw 240 may be applied. Also in the present structure, the screw 240 is rotated by the rotational force provided by the motor 200, and rotation motion of the screw 240 is converted into linear motion of the carrier 120 so that the anchor unit 100 moves forwards and backwards together.

Furthermore, as illustrated in FIG. 1 and FIG. 2, the anchor moving apparatus has a structure provided on the seat 10.

For example, a seat rail including a lower rail and an upper rail may be provided under the seat 10, and a mounting bracket 12 may be coupled to a side surface of the upper rail, which moves with the seat 10, in a front and rear longitudinal direction thereof.

Because the screw 240 is provided on the mounting bracket 12 in the front and rear longitudinal direction, the anchor pretensioner 110 may be configured to move forwards and backwards with the seat 10.

Therefore, regardless of the position of the seat 10, the anchor pretensioner 110 moves forwards and backwards with respect to the seat 10 to protect the passenger safely.

Furthermore, according to an exemplary embodiment of the present disclosure, the position of the anchor pretensioner 110 may be actively controlled according to the posture of the seat 10.

To the present end, according to an exemplary embodiment of the present disclosure, the seat belt may further include: a controller 500 configured to control operation of the motor 200 to move the anchor unit 100 forward or backward when a state of the seat 10 detected based on the position of the seat 10 satisfies a forward movement state or a backward movement state of the anchor unit 100.

For example, it may be determined whether the forward movement state and the rearward movement state of the anchor unit 100 are satisfied based on the position of a seat track, the angle of a seatback, and the angle of a seat cushion.

Accordingly, when it is determined that the passenger is sitting in a relaxation mode, it is determined that the forward movement state of the anchor unit 100 is satisfied so that the anchor pretensioner 110 is moved forward through a one-directional operation of the motor 200.

On the other hand, when it is determined that the passenger is sitting in a normal sitting mode, it is determined that the backward movement state of the anchor unit 100 is satisfied so that the anchor pretensioner 110 is moved backward through an opposite-directional operation of the motor 200.

For reference, the controller 500 according to various exemplary embodiments of the present disclosure is a non-volatile memory configured to store data about an algorithm configured to control operation of various components of a vehicle or a software command for reproducing the algorithm and a processor configured to use the data stored in the corresponding memory to perform operations described below. Here, the memory and the processor may be implemented as individual chips. Alternatively, the memory and processor may be implemented as a single chip integrated with each other. A processor may have a form of one or more processors.

Figure 5:
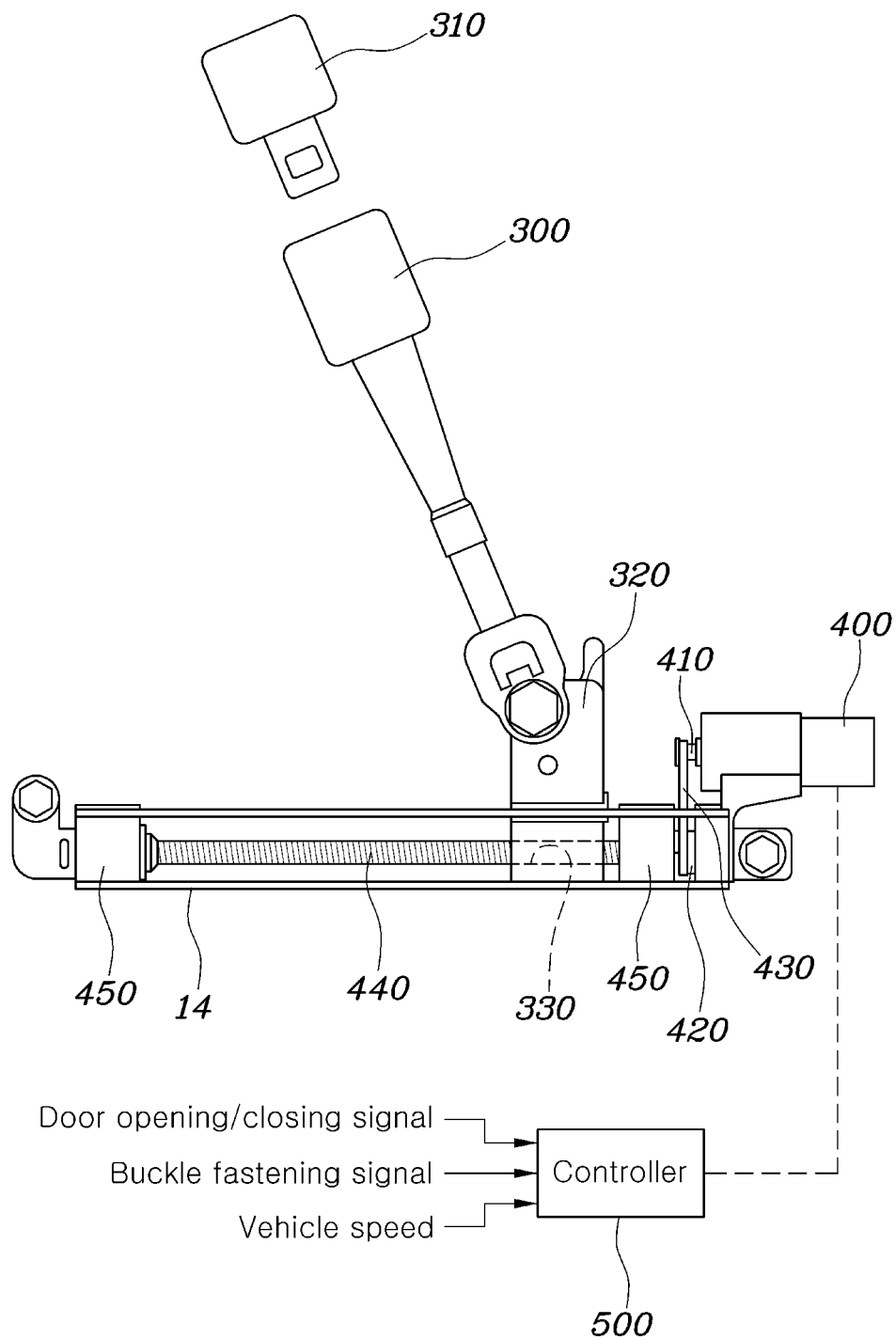
FIG. 5 is a view exemplarily illustrating a configuration of a buckle moving apparatus for moving the buckle according to an exemplary embodiment of the present disclosure.

FIG. 5 is a view exemplarily illustrating the configuration of the buckle moving apparatus for moving the buckle 300 according to an exemplary embodiment of the present disclosure.

Referring to FIGS. 1 and 5, the seat belt may include: a buckle 300 provided under the other side of the seat 10 and to which a tongue 310 of the seat belt S is fastened; and a buckle moving apparatus configured to move the buckle 300 forwards and backwards thereof.

For example, the buckle 300 is a portion to which the tongue 310 hooked on the seat belt S is fastened, and the buckle 300 is moved forwards and backwards by the buckle moving apparatus, so that the seat belt S fixed to the buckle 300 is also moved forwards and backwards together.

That is, when the door is open, the buckle 300 is located on a front side of the seat and the buckle 300 is fastened, the buckle 300 is moved backward, and thus fastening convenience of the buckle 300 is increased, and a passenger's lower body is stably fixed to protect the passenger safely during a driving state of a vehicle.

Furthermore, the buckle 300 may be configured to be movable based on an electric driving force of a motor 400.

Referring to FIG. 5, the buckle moving apparatus may include: the motor 400 configured to provide a rotational force; and a motion conversion apparatus configured to move the buckle 300 linearly by converting rotation motion of the motor 400 into linear motion of the buckle 300.

That is, because the motor 400 and the buckle 300 are connected by the motion converting means, the rotation motion provided from the motor 400 is converted into the linear motion by the motion converting means so that the buckle 300 may move forward or backward thereof.

As an exemplary embodiment of the motion conversion means, the motion conversion apparatus may include: a screw 440 provided before and after the seat 10 and configured to be rotated by the rotational force transmitted from the motor 400; and a carrier 320 coupled to the buckle 300, including a screw hole formed to allow the screw 440 to be inserted thereinto while surrounding the screw 440 in a screw structure, and configured to move forwards and backwards with the buckle 300 according to a rotation direction of the screw 440.

The screw 440 is provided in a front and rear longitudinal direction of the seat 10 so that the front and rear end portions thereof are rotatably supported by a bearing 450.

An upper pulley 410 is coupled to a shaft of the motor 400, a lower pulley 420 is coupled to the rear end portion of the screw 440, and the upper pulley 410 and the lower pulley 420 are connected by a moon belt 430 to reduce the rotational force of the motor 400 and transmit the reduced rotational force to the screw 400.

Accordingly, when the screw 440 is rotated, the carrier 320 is moved forward or rearward along the screw 440 according to the rotation direction of the screw 440, and the buckle 300 coupled to the carrier 320 moves forwards and backwards together.

Furthermore, the buckle moving apparatus has a structure which is provided on the seat 10.

For example, a seat rail including a lower rail and an upper rail may be provided on a lower portion of the seat 10, and a mounting bracket 14 may be coupled to a side surface of the upper rail, which moves together with the seat 10, in a front and rear direction thereof.

Therefore, regardless of the position of the seat 10, the buckle 300 may be moved forwards and backwards with respect to the seat 10 so that a passenger is safely protected.

Furthermore, according to an exemplary embodiment of the present disclosure, the position of the buckle 300 may be actively controlled according to an opening state or a closing state of a door and a fastening state of the buckle 300.

To the present end, the seat belt according to an exemplary embodiment of the present disclosure may further include: a controller 500 configured to move the buckle 300 forwards and backwards by controlling operation of the motor 400 when the opening/closing state of the door and the fastening state of the buckle 300 satisfy a forward movement state or backward movement state of the buckle 300.

Accordingly, when the door is open, it is determined that the forward movement state of the buckle 300 is satisfied, so that the buckle 300 is moved forward through a one-directional operation of the motor 400, and thus convenience of a passenger who sits on a seat and fastens the buckle 300 may be increased.

On the other hand, when the buckle 300 is fastened or the vehicle is in a driving state, it is determined that the backward movement state of the buckle 300 is satisfied, so that the buckle 300 is moved backward through an opposite-directional operation of the motor 400.

Furthermore, the seat belt according to an exemplary embodiment of the present disclosure may be configured so that the buckle 300 is moved forwards and backwards instead of a structure in which the anchor unit 100 moves forwards and backwards thereof.

That is, in the case of the anchor unit 100 described above, the anchor unit 100 is configured to move forwards and backwards according to a state of the seat 10. This is applied to the buckle 300, so that the buckle 300 may be configured to move forwards and backwards according to the state of the seat 10.

Accordingly, in a state in which a passenger is normally sitting on the seat, the anchor unit 100 is located at a rear side of the seat 10, so that the passenger who is sitting on the seat 10 may be protected safely. In a state in which the passenger is sitting in a relaxation mode, as the anchor unit 100 moves forward, a force for restraining the passenger's pelvis is increased, so that a submarine phenomenon of the passenger is reduced, and thus the passenger may be protected safely.

On the other hand, referring to FIG. 1 and FIG. 2, a method for controlling movement of a seat belt S according to an exemplary embodiment of the present disclosure may include: detecting, by a controller 500, a state of a seat 10 to detect the state of the seat 10 based on the position of the seat 10; and controlling, by the controller 500, movement of an anchor unit 100 to move the anchor unit 100 forwards and backwards when the state of the seat 10 satisfies a forward movement state or backward movement state of the anchor unit 100 to which webbing of the seat belt S is fastened.

When the state of the seat is a relaxation mode while a buckle is fastened, it may be determined that the forward movement state of the anchor unit is satisfied.

That is, when it is determined that the passenger is sitting in the relaxation mode, it is determined that the forward movement state of the buckle 300 is satisfied, so that the buckle 300 is moved forward through a one-directional operation of a motor 400.

On the other hand, when it is determined that the passenger is sitting in a normal sitting mode, it is determined that the backward movement state of the buckle 300 is satisfied, so that the buckle 300 is moved backward through an opposite-directional operation of the motor 400.

Furthermore, referring to FIG. 5, the method may further include: controlling movement of the buckle 300 to move the buckle forwards and backwards when a state of a vehicle and a fastening state of the buckle 300 satisfy the forward movement state or the backward movement state of the buckle 300.

When a door of the vehicle is open, it is determined that the forward movement state of the buckle 300 is satisfied.

Furthermore, when the buckle 300 is fastened, it may be determined that the backward movement state of the buckle 300 is satisfied.

Figure 6:
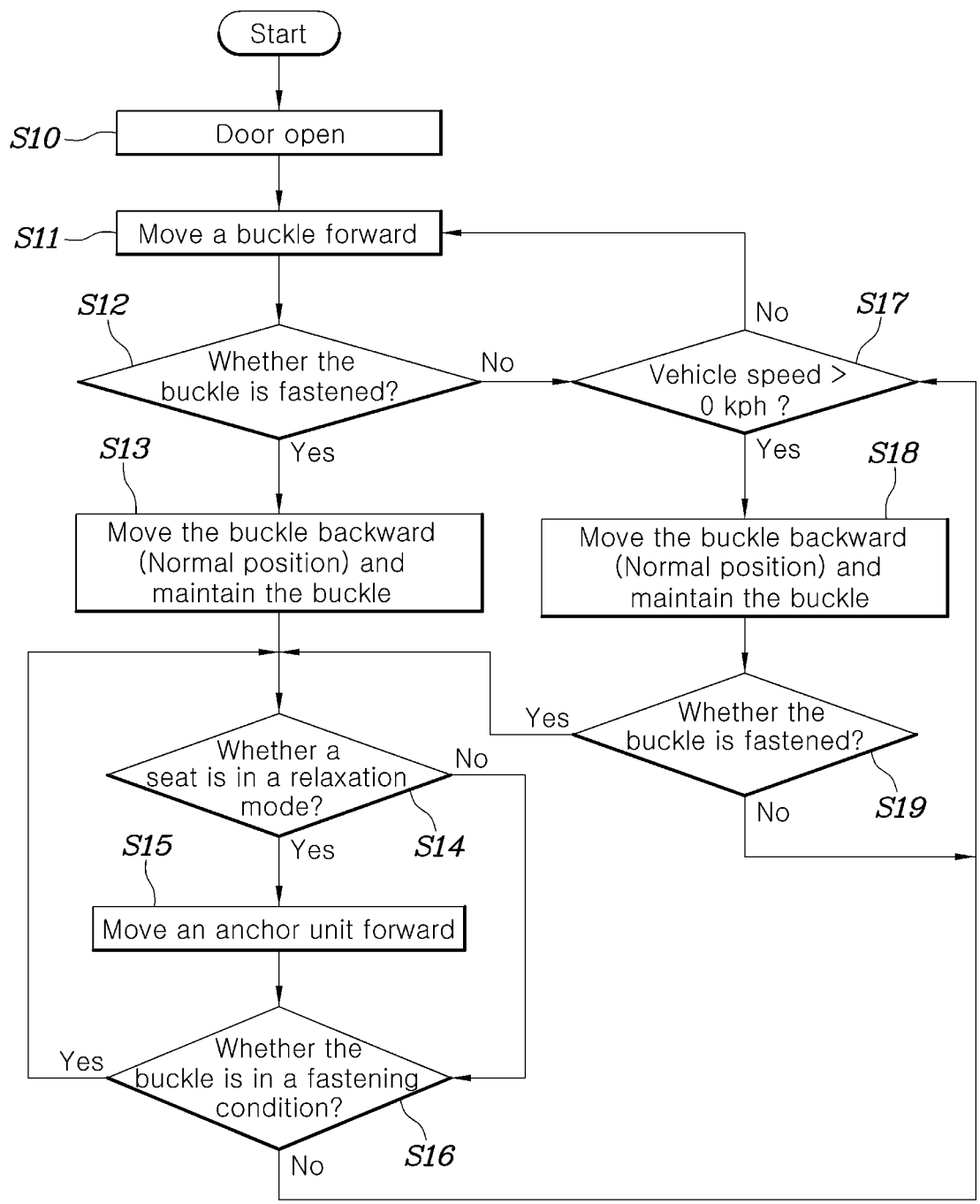
FIG. 6 is a flowchart illustrating a movement control process of the buckle and the anchor unit according to an exemplary embodiment of the present disclosure.

On the other hand, FIG. 6 is a flowchart illustrating a movement control process of the buckle and the anchor unit according to an exemplary embodiment of the present disclosure. Hereinafter, the movement control process of the buckle 300 and the anchor unit 100 will be described.

Whether a door is open or closed is monitored while a vehicle is stopped, and when the door is open during a monitoring process (S10), a motor 400 is operated in one direction to move the buckle 300 forward (S11).

Next, it is determined whether a tongue 310 is fastened to a buckle 300 of a seat 10 on which a passenger is sitting (S12), and when it is determined that the buckle 300 is fastened based on a determination result, the motor 400 is operated in an opposite direction to move the buckle 300 backward (S13).

At the same time, it is determined whether the passenger who is sitting on the seat 10 is sitting in a relaxation mode based on a state of the seat 10 (S14).

As a determination result of the step S14, when it is determined that the passenger is sitting in the relaxation mode, the motor 200 is operated in one direction to move the anchor unit 100 forward (S15).

Accordingly, when a collision of a vehicle occurs, a waist belt is moved forward by forward movement of the anchor unit 100, and thus a force for escaping the waist belt from the passenger's pelvis is reduced, and at the same time, a force for restraining the passenger's pelvis is increased.

Therefore, because a restraining force for the passenger's lower body is increased, a submarine phenomenon of the passenger is reduced, and thus the passenger is protected safely.

On the other hand, as the determination result of the step S14, when it is determined that the passenger is sitting in a normal mode, the anchor unit 100 is maintained in a rear position, and thus the passenger who is sitting on the seat 10 is protected safely.

Next, it is determined whether the fastening state of the buckle 300 is maintained (S16), and as a determination result, when it is determined that the fastening state of the buckle 300 is maintained, the process proceeds to the step S14, so that forwards and backwards movement of the anchor unit 100 is controlled according to a sitting state of the seat 10.

On the other hand, as a determination result of the step S16, it is determined whether a vehicle speed exceeds 0 kph when the buckle 300 is released (S17).

Furthermore, as a determination result of the previous step S12, when it is determined that the buckle 300 is not fastened, the process proceeds to the step S17 to determine the vehicle speed.

Therefore, when the vehicle speed exceeds 0, kph, regardless of whether the buckle 300 is fastened, the buckle 300 is moved backward (S18).

Accordingly, it is continuously monitored whether the buckle 300 is fastened (S19), and when it is determined that the buckle 300 is fastened during the monitoring process, the process proceeds to the step S14 and the forwards and backwards movement of the anchor unit 100 is controlled according to the sitting state of the seat 10.

On the other hand, as a determination result of the step S19, when it is determined that the buckle 300 is not fastened, the process proceeds to the step S17 and the forwards and backwards movement of the buckle 300 is controlled according to the vehicle speed.

As described above, when a passenger is normally sitting on a seat, the existing laws are satisfied at the time of a vehicle collision, so that the passenger who is sitting on the seat is protected safely, and when the passenger is sitting in a relaxation mode, a force for restraining the passenger's pelvis is increased by forward movement of the anchor unit, so that a force for restraining the passenger's lower body is increased, providing an advantage of protecting the passenger safely by decreasing a submarine phenomenon of the passenger.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A seat belt apparatus, comprising:
an anchor unit provided on a lower portion of a first side surface of a seat and configured for allowing webbing of the seat belt apparatus to be locked thereto; and
an anchor moving apparatus configured to move the anchor unit forwards and backwards thereof,
wherein the anchor moving apparatus includes:
a motor configured to provide rotational force; and
a motion conversion apparatus configured to linearly move the anchor unit by converting rotation motion of the motor into linear motion of the anchor unit,
wherein the motion conversion apparatus includes:
a screw provided before and after the seat and configured to be rotated by the rotational force transmitted from the motor; and
a carrier coupled to the anchor unit, including a screw hole formed in the carrier for the screw to be inserted into and engaged to the screw hole, and configured to move forwards and backwards together with the anchor unit according to a rotation of the screw,
wherein an upper pulley is coupled to a shaft of the motor,
wherein a lower pulley is coupled to the screw, and
wherein the upper pulley and the lower pulley are coupled by a power transmission belt to transmit the rotational force of the motor to the screw.

2. The seat belt apparatus of claim 1,
wherein front and rear end portions of the screw are rotatably supported by bearings.

3. The seat belt apparatus of claim 1, wherein the anchor moving apparatus is provided on the seat.

4. The seat belt apparatus of claim 1, further including:
a controller configured to move the anchor unit forwards and backwards by controlling operation of the motor when a state of the seat determined based on a position of the seat satisfies a forward movement state or a backward movement state of the anchor unit.

5. The seat belt apparatus of claim 1, further including:
a buckle provided on a lower portion of a second side surface of the seat and configured to allow a tongue of the seat belt apparatus to be fastened thereto; and
a buckle moving apparatus configured to move the buckle forwards and backwards thereof.

6. The seat belt apparatus of claim 5, wherein the buckle moving apparatus includes:
a motor configured to provide rotational force; and
a motion conversion apparatus configured to linearly move the buckle by converting rotation motion of the motor of the buckle moving apparatus into linear motion of the buckle.

7. The seat belt apparatus of claim 6, wherein the motion conversion apparatus of the buckle moving apparatus includes:
a screw provided before and after the seat and configured to be rotated by the rotational force transmitted from the motor of the buckle moving apparatus; and
a carrier coupled to the buckle, including a screw hole formed in the carrier of the buckle moving apparatus for the screw to be inserted into and engaged to the screw hole of the buckle moving apparatus, and configured to move forwards and backwards together with the buckle according to a rotation of the screw of the buckle moving apparatus.

8. The seat belt apparatus of claim 7, further including:
an upper pulley coupled to a shaft of the motor of the buckle moving apparatus;
a lower pulley coupled to the screw of the buckle moving apparatus; and
wherein the upper pulley and the lower pulley of the buckle moving apparatus are coupled by a power transmission belt of the buckle moving apparatus to transmit the rotational force of the motor of the buckle moving apparatus to the screw of the buckle moving apparatus.

9. The seat belt apparatus of claim 8, wherein front and rear end portions of the screw of the buckle moving apparatus are rotatably supported by bearings.

10. The seat belt apparatus of claim 6, wherein the buckle moving apparatus is provided on the seat.

11. The seat belt apparatus of claim 6, further including:
a controller configured to control operation of the motor of the buckle moving apparatus to move the anchor unit forwards and backwards when an opening state or a closing state of a door and a fastening state of the buckle satisfy a forward movement state or a backward movement state of the anchor unit.

12. A movement control method for the seat belt apparatus of claim 1, the method including:
determining, by a controller, a seat state to determine a state of the seat based on a position of the seat; and
controlling, by the controller, movement of the anchor unit to move the anchor unit forwards and backwards when the state of the seat satisfies a forward movement state or a backward movement state of the anchor unit to which the webbing of the seat belt apparatus is fastened.

13. The method of claim 12, wherein the forward movement state of the anchor unit is satisfied when the state of the seat is a relaxation mode while a buckle is fastened.

14. The method of claim 12, further including:
controlling movement of the buckle to move the buckle forwards and backwards when a state of a vehicle and a fastening state of the buckle satisfy a forward movement state or a backward movement state of the buckle.

15. The method of claim 14, wherein the forward movement state of the buckle is satisfied when a door of the vehicle is open.

16. The method of claim 14, wherein the backward movement state of the buckle is satisfied when the buckle is fastened.

* * * * *